June 4, 1968   H. N. LUIJT   3,386,541
BRAKE-ACCELERATOR DEVICE
Filed March 21, 1966   3 Sheets-Sheet 3
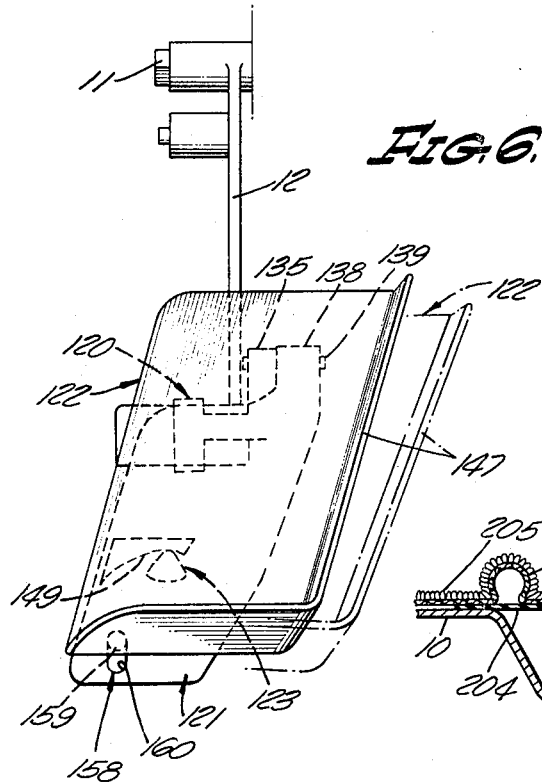
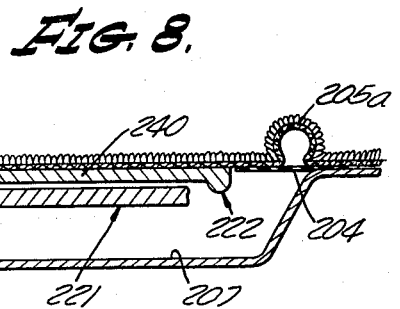
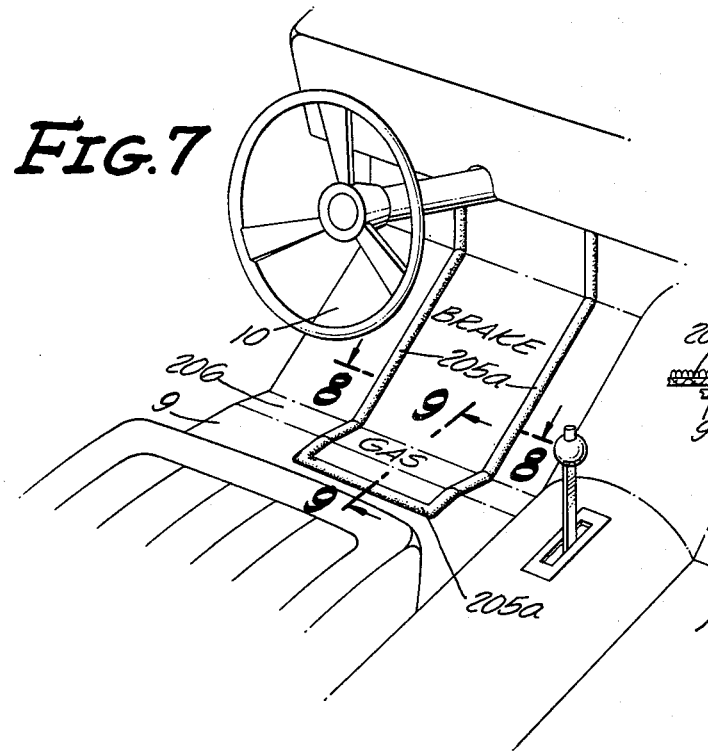
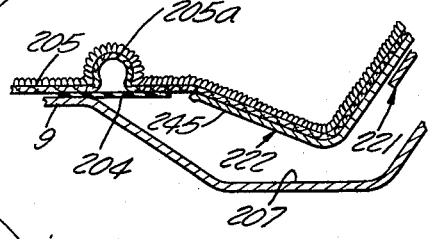
INVENTOR.
HERMANUS N. LUIJT
BY Lyon & Lyon
ATTORNEYS

United States Patent Office 3,386,541
Patented June 4, 1968

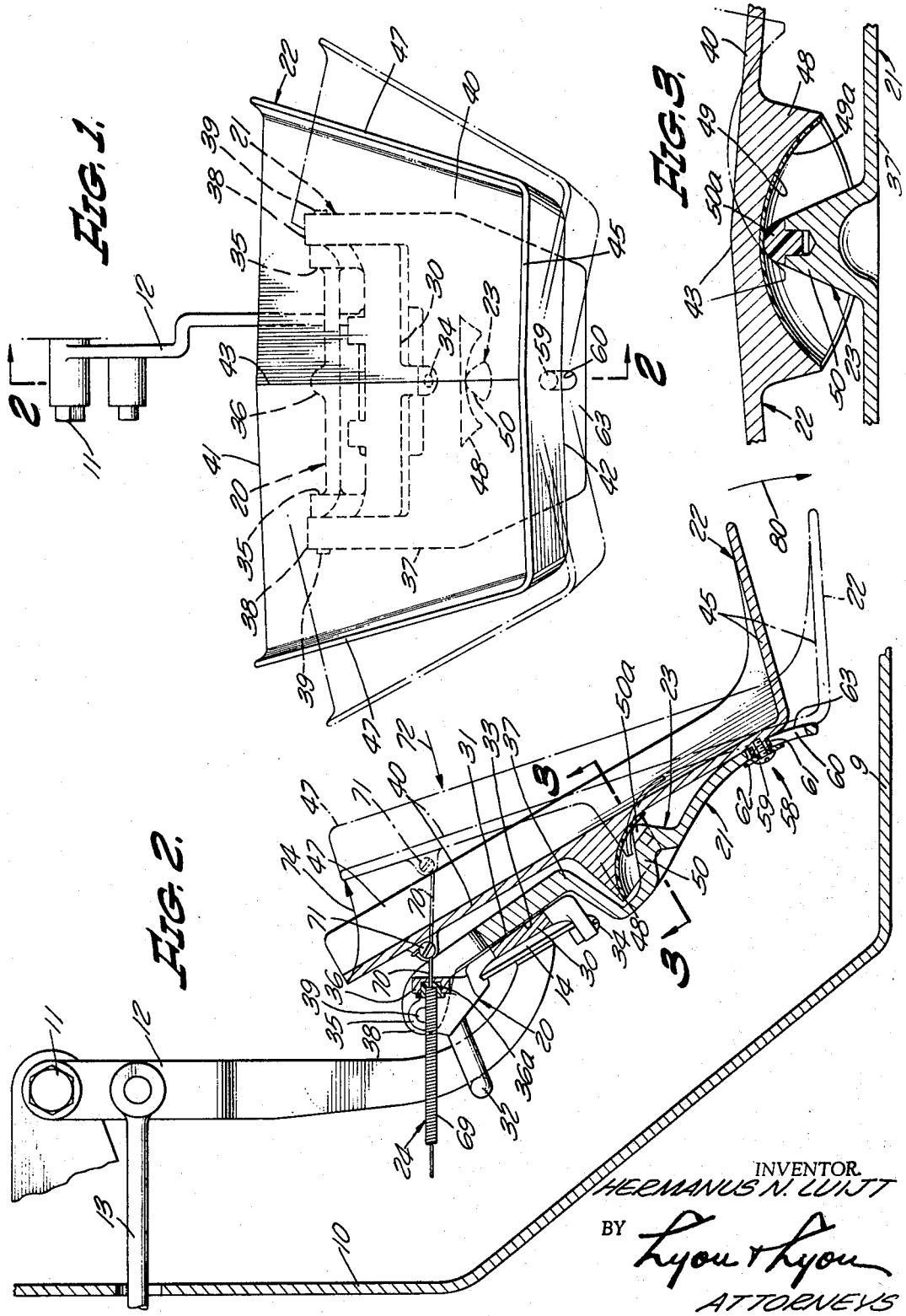

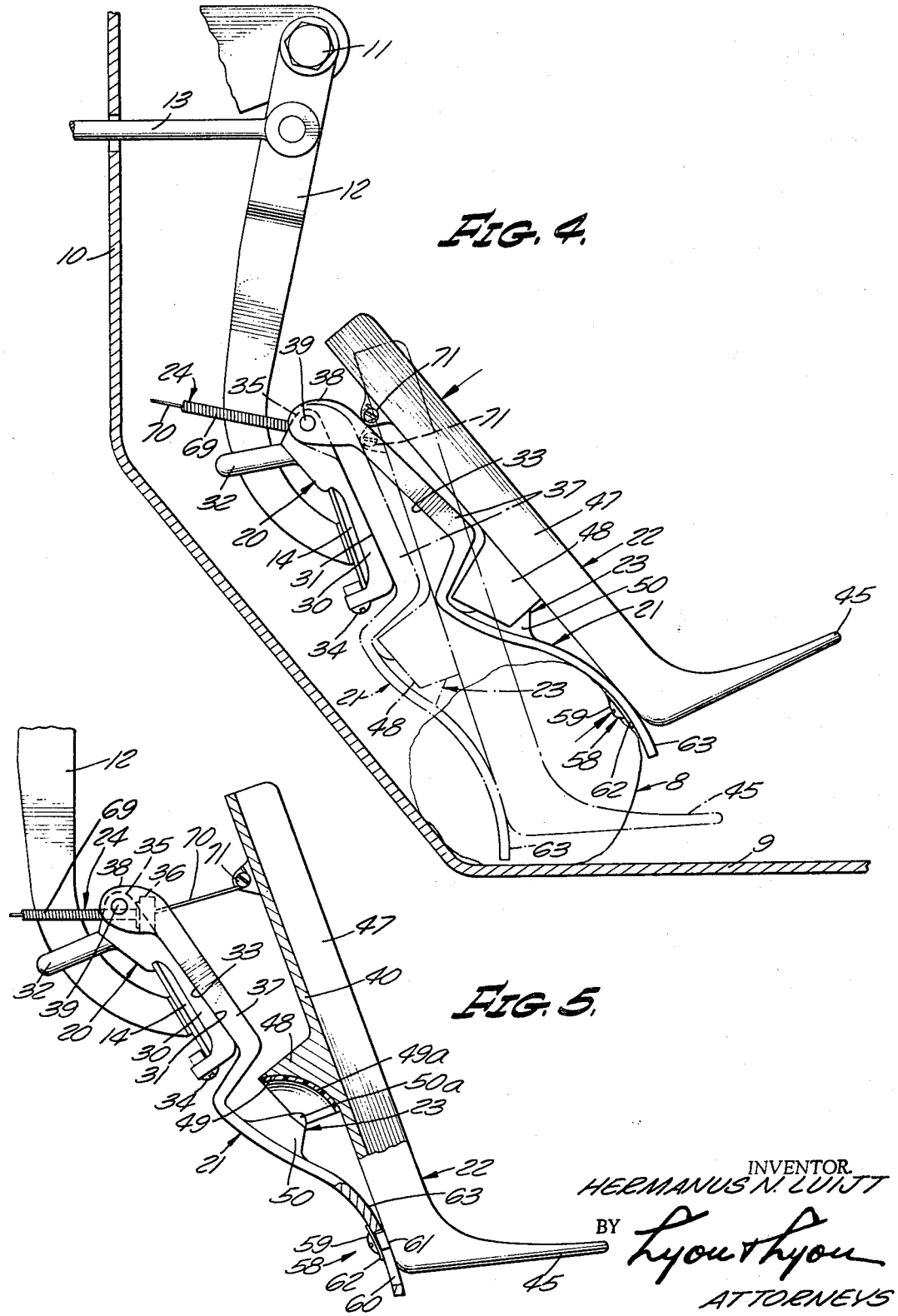

3,386,541
BRAKE-ACCELERATOR DEVICE
Hermanus N. Luijt, 4105 Glencoe Ave.,
Venice, Calif. 90291
Continuation-in-part of application Ser. No. 320,085,
Oct. 30, 1963. This application Mar. 21, 1966, Ser.
No. 535,895
17 Claims. (Cl. 192—3)

ABSTRACT OF THE DISCLOSURE

An apparatus having a foot pedal for selectively operating both the brake and accelerator of an automobile or the like by selective movement of the pedal where the pedal is mounted on a supporting base for longitudinal heel-toe movement and perhaps pivotal movement relative to the base with such movements causing actuation of the accelerator and a cam arrangement between the pedal and supporting base to automatically return the pedal to a non-accelerator-applying position when the pedal is urged in the natural, forward brake-applying direction whereby braking is accomplished by movement of the base.

---

This is a continuation-in-part application of my pending application entitled, "Brake-Accelerator Pedal," Ser. No. 320,085, filed Oct. 30, 1963 and is now abandoned.

This invention relates to a pedal device that combines a foot brake and a foot-operated accelerator for vehicles, particularly for automotive use.

Although many devices have been developed for combining the brake and accelerator of a vehicle, each such heretofore developed device has been unacceptable for various reasons. A device of this type must be readily operable to accomplish either of the functions successfully with a minimum opportunity for inadvertent or incorrect operation. For example if an emergency situation should arise the normal reaction of the operator should cause braking and release of the accelerator without requiring the operator to think of the proper manner of manipulating the device to cause braking. Further, the operation of the accelerator should inhibit the possibility of simultaneously operating the brake and yet it must be possible to advance the accelerator while applying the brake for accomplishing such maneuvers as starting the vehicle on an incline. Moreover for the most universal use and acceptance it is preferably that the device be operable by either foot with acceleration being accomplished by a variety of movements for selection by personal preference.

In accordance with these requirements, an object of the present invention is to provide a brake-accelerator device susceptible of operation by either or both feet with braking being accomplished by the normal forward-downward foot motion and acceleration being accomplished by either downward-rearward movement in the general toe-to-heel direction or lateral pivotal movement of the toe in either direction.

The invention has for an object to provide a single-foot controller for braking and accelerating an automotive vehicle, the same being so formed and devised that either the left or the right foot or both feet may be used for braking and accelerating, thereby providing a means that enables a driver, during long stretches of open-road driving, to change from one foot to the other to improve comfort. Some crippled persons will be able to drive again and with more safety and comfort.

Another object of the invention is to provide an automotive brake-accelerator pedal that obviates "riding" the brake.

A further object is to provide a pedal as above characterized that provides for braking by a forward movement of the pedal with either foot or both feet, relieving the accelerator automotically by the foot braking pressure, and for accelerating by a longitudinal up-down and/or lateral pivotal movement.

A still further object of this invention is to provide such a pedal device which normally remains in non-braking position during normal engine acceleration, although the throttle may be accelerated, if needed, with the pedal in braking position, as when starting on an upgrade. The safety and ease of driving with high heels is much improved.

Another object of this invention is to provide a novel form of brake-accelerator device employing a movable platform for operating the device with such platform positioned coplanar with the floor of the vehicle whereby a flexible webbing of floor covering may extend across the platform and floor to provide a completely unobstructed and uncluttered area. A still further object is to provide such a device wherein the platform is merely forced forwardly and downwardly to apply the brake and is shifted in a rearward-downward direction by the operator's heel for causing acceleration.

Still another object of this invention is to provide a brake-accelerator device adapted to be mounted above the floor level and pivoted to the brake actuating mechanism for permitting operation of the brake by forward movement of the operator's foot although normal forward movement of the device is obstructed whereby the obstruction merely causes pivoting of the device relative to the brake actuating mechanism without inhibiting brake actuation.

Other objects and advantages are quicker action of a single foot control, convenience, foot relaxation, lower reaction time, better steep-grade control, no foot slippage between pedals, no shoe scuffing, no "freezing" on the accelerator, and many others.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings, wherein:

FIGURE 1 is a front elevation of one form of the brake-accelerator device of this invention illustrating in phantom lines the two alternative lateral motions for causing accelerator operation.

FIGURE 2 is a sectional elevation of the device taken substantially on the line 2—2 in FIGURE 1 and illustrating in phantom lines the downward-rearward longitudinal motion of the device for causing accelerator operation.

FIGURE 3 is a fragmentary sectional view taken substantially on the line 3—3 in FIGURE 2 and illustrating the interengaging cam means on the device.

FIGURE 4 is a side elevation view of the device illustrating braking actuation of the device wherein an obstruction has inadvertently become lodged beneath the device thereby preventing its normal movement to the position illustrated in phantom lines but without preventing actuation of the braking mechanism.

FIGURE 5 is a fragmentary side elevation view illustrating the accelerator actuation of the device solely by means of lateral pivoting such as is shown by the phantom lines in FIGURE 1.

FIGURE 6 is a modified form of the brake-accelerator device of this invention adapted to be operated by one foot rather than being capable of accommodating both feet as with the device of FIGURES 1-5.

FIGURE 7 is a perspective view of a second modified form of the device of this invention adapted for installation in the automobile during manufacture to provide a completely clear floor area.

FIGURE 8 is a sectional view taken substantially on the line 8—8 shown in FIGURE 7.

FIGURE 9 is a sectional elevation taken substantially on the line 9—9 shown in FIGURE 7.

Referring now more particularly to the embodiment of FIGURES 1–5, there is illustrated the usual fire wall 10 of an automotive vehicle and the pivot 11 on which a brake pedal 12 is pivotable to effect contraction of a master brake cylinder (not shown) by means of the conventional link or stem 13 connected to the pedal 12. A spring return is provided in the conventional manner for returning the brake pedal 12 to the brake-release position illustrated in FIGURE 2. This embodiment is adapted for installation on a conventional vehicle in a relatively simple manner although modifications to the conventional braking apparatus for ease of operation. For example, with vehicles that require a relatively large movement of the brake pedal to cause actuation of the brakes, it may be desirable to modify the linkage in a manner whereby brake operation is achieved by a smaller amount of movement of brake pedal. Further a detent mechanism or stronger spring return may be desirable to assure that the brake pedal is returned to the brake-release position, in spite of the weight of the device of this invention, upon release of foot pressure by the operator. However, these modifications are desirable merely by virtue of the individual characteristics of conventional vehicles and therefore do not form a part of this invention and are not absolutely required for operation of the device of this invention.

The present brake-accelerator device comprises, generally, a mounting plate 20, a base member 21 pivotally attached to and resting upon the plate 20, a foot member 22 movably connected to the base member 21, cam means 23 interengaging said base and foot members to cause the upper portion of the foot member 22 to move upwardly away from the upper portion of the base member 21 during either pivotal or downward-rearward movement of the foot member, and a Bowden cable or wire 24 carried by the base member 21 and connecting said foot member 22 to the accelerator throttle of the vehicle.

The mounting plate 20 is conveniently attached in a rigid fashion to the lower end of the pedal 12 at the foot pad 14. The mounting plate 20 includes a plate part 30 that is formed to fit over the foot pad 14 and a hook portion 32 that is adapted to engage the back side of the pedal 12 for further supporting the plate on the pedal. A lock bolt 34 secures the lower portion of the plate 30 to the pedal pad 14 thereby rigidly attaching the mounting plate 20 to the brake pedal 12. The upper portion of mounting plate 20 is provided with laterally spaced pivot ears 35 with a boss 36 positioned therebetween and centrally of the plate for receiving the Bowden cable 24. The exterior sheath of the Bowden cable 24 is secured to the boss 36 and the internal wire of the Bowden cable extends through the boss 36.

The base member 21 comprises a plate 37 that, at its upper end, is provided with pivot ears 38, complementary to the ears 35 on the mounting plate 20 for receiving pivot pins 39 to pivotally connect the base member 21 to the mounting plate 20. The base member 21 may be raised on its pivot for any purpose such as for clearing an accidental obstruction beneath the base member. While the base member 21 may be lifted relative to the mounting plate 20, it is supported against downward movement by the interengagement of the outer or upper surface 31 on the base plate and the under side 33 of the upper portion of the plate 37. The base member 21 is disposed at an angle that is forwardly and upwardly directed with respect to the vehicle operator at approximately the most comfortable attitude as thus supported on the mounting plate 20.

The foot member 22 comprises a platform or plate 40 that is substantially wider than the plate 37 of the base member 21 and is preferably flared at its upper end so as to have an isosceles trapezoidal from with the upper edge 41 being wider than the lower edge 42. The plate 40, as may be observed from FIGURE 3, is divided by a medial line 43 into two lateral and oppositely flatly angled portions, the purpose therefore being to provide for flat left or right foot engagement with said foot member 22 from the operator's position in the vehicle and to enhance the tendency to return the foot member 22 to the central position when applying braking foot pressure with the foot member 22 pivoted laterally to the left or right.

The lower edge 42 is provided with an extra high rearwardly directed wall 45 to support the heel portion of the operator's shoe, whether high or low heeled, which is engaged with the plate 40. Each of the diverging side edges of the plate 40 is provided with a rearwardly or outwardly extending side wall 47 adapted to be engaged by the edge of the operator's shoe, especially when accelerating the vehicle by pivoting the foot member laterally.

The foot member 22 is connected to the base member 21 at the lower ends of both members by a connecting means, generally designated 58, which permits lateral pivoting of the foot member 22 in either direction and longitudinal sliding movement of the foot member in the general heel-to-toe direction, that is, in the general up-down direction of the plane of the foot member 22. The connecting means 58 preferably is comprised of a stud 59 mounted on the foot member 22 and extending through an elongated slot 60 in the base member 21. The stud 59 may be encircled by a bushing 61 of antifriction material such as Teflon or nylon and be provided with a similar antifriction washer 62 for engaging the underside of the base member 21. It may be seen that by this connection the foot member 22 may be pivoted laterally in either direction and moved longitudinally up or down relative to the base member 21 or any combination of such longitudinal and pivoting movements. The outer surface 63 of the lower portion of base member 21 is preferably curved to accommodate the curvilinear movement followed by the foot member 22.

The relative movement between the base member 21 and the foot member 22 is dictated by the cam means 23 which is comprised of a cam socket 48 formed on the bottom of the foot member 22 and a projecting cam follower 50 formed on the base member 21. The cam socket 48 is provided with a downwardly facing and conically or spherically shaped cam surface 49 that may be lined or coated with an antifriction material 49a for improved operation. The tip of the cam follower 50 may be provided with an antifriction knob 50a if desired. Since the base and foot member 21 and 22, respectively, are slideably and pivotally joined at their lower ends the foot member 22 may be manipulated through an infinite variety of movements which will cause interengagement between the cam 50 and any portion of the cam surface 49 with the resultant effect that the upper portions of the two members will be progressively separated or moved toward each other depending on the portion of the cam surface 49 which is engaged by the cam follower during such manipulation.

The Bowden wire 24 is quite conventional, comprising a flexible tube or sheath 69 that is affixed to the boss 36 and has an operating wire 70 extending through the boss with an antifriction bushing 36a encircling the wire to assure its free movement in and out of the sheath 69. The terminal end of the wire 70 is attached by a screw 71 to the under side of the upper portion of the foot member 22. Separate means such as a tension spring may be employed for urging the upper portion of foot member 22 toward the upper portion of base member 21 for continually urging the Bowden wire 70 onto the sheath 69 but for most situations it has been found that tension on the Bowden wire 70 itself is sufficient to cause such return movement of the foot member 22. The Bowden cable 24 is connected to the throttle of the vehicle and the relative separating movement between the upper portions of the base and foot members causes accelerating operation of the vehicle throttle. Of course any equivalent mechanical electrical or hydraulic means may be substituted for the Bowden cable 24 which will similarly respond to such relative movement for actuating the vehicle throttle.

Referring specifically to FIGURE 2, the foot member 22 is shown in section in substantially the unactuated position wherein the throttle of the vehicle is at substantially idle. It is to be noted that in this condition the tip of cam follower 50 is at nearly the deepest point in the cam surface 49 and that the stud 59 is at nearly the top of slot 60. Thus, the foot member 22 can be moved slightly upwardly which would cause further closing movement of the foot member toward the base member 21. In fact, the illustrated position may be the lowest idle condition of the vehicle or perhaps slightly advanced therefrom.

From the position shown in section in FIGURE 2, the foot member 22 may be moved in a generally downward-rearward direction by the operator applying pressure through the heel end of his shoe against the rearwardly extending wall 45 thereby causing sliding longitudinal movement of the stud 59 in the slot 60. This downward sliding movement of the foot member 22 in the direction of arrow 80 causes the upper portion of foot member 22 to be urged outwardly in the direction of arrow 74 by reason of the interengagement of the cam follower 50 with the cam surface 49. This rearward or outward movement of the upper portion of foot member 22 toward the position shown in phantom lines in FIGURE 2 produces a pulling movement on wire 70 of Bowden cable 24 thereby actuating the vehicle throttle to accomplish the acceleration function. It is to be noted that this downward longitudinal movement for causing acceleration may be accomplished without lateral pivoting movement of the foot member 22. From the throttle-actuated position shown in phantom lines in FIGURE 2, the release or return of the throttle to idle and braking of the vehicle is accomplished by the operator merely urging his foot forward in the most normal attitude which is in substantially the direction of arrow 72. Upon such movement the interengagement of the cam follower 50 with the sloping surface of the cam 49 will cause the foot member 22 to first move forwardly and slightly upwardly to return to the position shown by sectional lines without moving the base member 21 whereupon the brake mechanism is actuated by further forward movement to cause pivoting of pedal 12.

Referring to FIGURE 5, it may be seen that the separation of the upper portions of base member 21 and foot member 22 to produce pulling of Bowden wire 70 may also be accomplished by laterally pivoting the foot member 2 in either direction without necessarily moving the foot member in the downward longitudinal direction. This may be observed by the fact that the stud 59 remains at the upper end of slot 60 in FIGURE 5. The lateral shifting or pivoting is produced by the operator urging the edge of his shoe against one of the lateral walls 47. The laterally pivoted positions of foot member 22 in either direction are shown in phantom lines in FIGURE 1 and the position of cam surface 49 when pivoting to the right is shown in FIGURE 3 in phantom lines. It is obvious when considering this described accelerator operation by strictly pivoting movement in connection with the aforedescribed accelerator operation by strictly longitudinal downward movement that any combination of pivoting and longitudinal movements which are comfortable to the operator will likewise cause accelerator operation due to the spherical shape of the cam surface 49.

Referring to FIGURE 4 the braking actuation of the device is illustrated. The normal braking actuation involves merely urging the foot member 22 forwardly which due to the cam means 23 "bottoming out" and the interengagement between the surfaces 31 and 33 of the mounting plate 20 and base member 21 will urge the brake pedal 12 forwardly to cause the desired pivoting and resultant brake actuation. Normally, the base member 21 and foot member 22 will assume the positions shown in phantom lines in FIGURE 4 but if an obstruction 8 becomes accidentally lodged beneath the base member 21, then the desired forward movement of at least the lower portion of the base member 21 is prohibited. However, actuation of the vehicle's brakes is not prohibited since the base member 21 is pivoted by pins 39 to the mounting plate 20 whereby continued pushing of the operator's foot causes the braking pivoting of pedal 12 while the lower portion of base member 21 is supported on the obstruction as shown in solid lines in FIGURE 4. This extremely desirable safety feature whereby operation of the brakes is never prohibited is necessitated in part by the fact that the base member 21 extends downwardly to a position in close proximity to the floor 9 where an obstruction may be encountered which is not true of the conventional brake pedal foot pad 14.

Thus, the operation of the device of FIGURES 1–5 is obvious. While accelerating, the operator's toes do not press forwardly, but rather move rearwardly, as suggested by the arrow 74; the driver's heel moves downwardly. Hence, the foot is not prone to tire because braking is accomplished flat-footedly, and acceleration by lifting the toe end of the foot and transferring the pressure from the toes to the heel. Simply stated, braking is accomplished by movement along the line of arrow 72 and acceleration is accomplished (a) by a sliding movement of the foot member 22 in an arcuate path, as suggested by arrow 80, or (b) by a swinging movement of the foot member 22 to the side, or (c) by both of said movements simultaneously. It will be understood that at the points of pivot and other places of contact, insulating or deadening members of Teflon or other material may be interposed between the moving parts.

Referring now to the modified embodiment illustrated in FIGURE 6, the brake-accelerator device of this invention is again mounted on the conventional brake pedal 12 by means of a mounting plate, generally designated 120. The mounting plate 120 is provided with a single pivot ear 135 positioned to one side. The base member 121 is provided with a single pivot ear 138 adjacent pivot ear 135 and the two ears are joined by the pivot pin 139 similar to the afore-described embodiment and for the same safety purpose. The foot member 122 of this embodiment is of a width for accommodating only one foot of the operator and therefore is provided with only a single edge wall 147 along the right hand edge. Of course if left foot operation was desired, the edge wall 147 could be provided on the left hand edge and most desirably would be inclined in the opposite direction. The foot member 122 is again superimposed over the base member 121 and is connected thereto by the means 158 comprising a longitudinal slot 160 and a stud 159. The cam means 123 are substantially similar to the heretofore described cam means 23 but since the device is arranged for pivoting operation in only one direction, the cam surface 149 may be approximately one half of the afore-described cam surface 49. Thus the embodiment of FIGURE 6 may be manipulated to cause acceleration by either pivoting the foot member 122 to the right or by downward longitudinal movement of the foot member 122 in the slot 160 or by any combination of these two movements. The braking actuation is the same as with the heretofore described embodiment.

Referring now to the modified embodiment of FIGURES 7, 8 and 9, the brake accelerator device of this invention is illustrated as it might be incorporated in a vehicle as original equipment. Rather than mounting the device on a depending brake pedal 12, the base member 221 may be mounted directly on the brake actuating mechanism or supported in any other convenient manner. A well area or enclosure 207 is provided in the floor and fire wall of the vehicle in front of the operator. The base member 221 is positioned in this well enclosure with the foot member 222 superimposed thereon in the same manner as the heretofore described devices. The foot member 222 may be connected to the base member 221 in the same manner as heretofore described for both longitudinal sliding movement and lateral pivoting movement although as it will hereinafter appear the lateral pivoting movement is of little significance in this embodiment. The platform 240 of foot member 222 is positioned generally coplanar with the fire wall 10 of the vehicle in the normal unactuated position of the device. The foot member 222 is provided with the rearwardly extending wall 245 similar to the afore-described wall 45 for engagement by the heel end of the operator's shoe. The generally horizontal floor 9 of the vehicle may be provided with a slightly downwardly inclined portion 206 near the juncture with the fire wall 10 which is coplanar with the wall 245 on the foot member. In this manner the carpeting 205 of the vehicle may be applied in a continuous web covering the floor 9, fire wall 10 and the foot member 222. Around the periphery of the well enclosure 207, the carpeting 205 is provided with an expansion roll 205a of extra material with an elastic joint 204 for returning the carpeting to this rolled condition upon deactivation of the device. The rolled portion 205a of the carpeting is necessary to accommodate the movements of the foot member 222 relative to the surrounding flooring. The device of this invention is actuated in the same manner as the heretofore described embodiments, that is, forward pushing on the foot member causes brake operation and downward longitudinal force against the wall 245 in the downward-rearward direction causes the accelerator operation. Again a cam arrangement is provided whereby the downward accelerator operation causes outward movement of the upper portion of foot member 222 so that application of foot pressure by the operator to cause braking will first cause deactuation of the accelerator. With this embodiment lateral pivoting for accelerator operation is less easily accomplished since no side walls are provided for foot engagement as the device is illustrated but appropriate side walls or lugs may be provided for accommodating personal preference.

While the foregoing has illustrated and described what are now contemplated to be the best modes of carrying out the invention, the constructions are, of course, subject to modification without departing from the spirit and scope of the invention. Therefore, it is not desired to restrict the invention to the particular forms of construction illustrated and described, but my invention is of the full scope of the appended claims.

I claim:
1. A brake-accelerator attachment for a brake pedal having a foot pad,
   (a) a mounting plate removably connected to said foot pad and the adjacent portion of the pedal,
   (b) a base member superimposed on said mounting plate and connected thereto by a horizontal pivot at the upper end of both said plate and member,
   (c) a foot member superimposed on the base member, the base member with the foot member thereon being mounted to swing upwardly at their lower ends about said horizontal pivot,
   (d) pivot means connecting the lower portions of said members so the foot member is pivotally movable laterally in both directions from a normal middle position,
   (e) cam means partly on each said member to spread the upper portions thereof during pivotal movement of the foot member, and
   (f) a Bowden cable having its sheath connected to the upper portion of the base member, and its actuating wire connected to the upper portion of the foot member and pulled relatively to the sheath during movement of the foot member relative to the base member.

2. A brake-accelerator combination in which, on both sides of a medial line, the foot member is provided with opposite sloped faces.

3. A brake-accelerator attachment according to claim 1 in which the pivot means comprises a stud on the foot member and a slot in the base member in which said stud is engaged.

4. A brake-accelerator device for a brake operating means, comprising, a base member adapted for mounting on the brake operating means, a foot member superimposed on said base member, connecting means joining said members for longitudinal movement of said foot member relative to said base member in a generally downward-rearward direction relatively perpendicular to the direction of brake pedal movement, and accelerator operating means operatively connected to said members and actuated solely by said longitudinal movement between said members without additional manipulation of said foot member relative to said base member.

5. A brake-accelerator device of claim 4 for a downwardly-forwardly actuated brake operating means in which the foot member comprises a platform oriented substantially perpendicular to the direction of brake actuating movement and said platform is of a width at least equal to the lateral space normally occupied by the operator's feet for selectively accommodating either or both feet of the operator.

6. A brake-accelerator device of claim 4 for a downwardly-forwardly actuated brake operating means and a downwardly-rearwardly actuated accelerator mechanism in which the foot member has an edge wall along the lower portion thereof, and said edge wall extends both said member for a substantial distance for engaging and supporting the back of the heel of a high or low heeled shoe worn by the operator for application of the downward-rearward accelerator actuating movement.

7. The brake-accelerator device of claim 4 for a downwardly-forwardly actuated brake operating means in which the base member is mounted on the brake operating means and extends downwardly and rearwardly, and connecting means mounting said base member on said brake operating means for upward pivotal movement of the downwardly extending portion of said base member upon actuation of said brake operating means when encountering an obstruction thereunderneath for permitting unimpaired actuation of said brake operating means.

8. In a brake-accelerator device of claim 4 for a vehicle having a floor with a generally horizontal portion joined at the forward extremity to a forwardly-upwardly inclined portion with a forwardly-downwardly actuated brake operating means beneath such floor, the combination of, the said foot member comprising a portion of said floor and generally coplanar therewith including a forwardly-upwardly inclined platform relatively perpendicular to the direction of brake actuation and a rearwardly extending wall at the base of said platform, means supporting said foot member for distinctive movements in the directions both relatively perpendicular to said platform and in the general up-down longitudinal direction coplanar with said platform, means on said supporting means and foot member cooperating to urge said platform rearwardly upon downward movement in said longitudinal direction, means operatively connecting said foot member to the brake operating means for actuation upon forward-downward movement of said platform, and means operatively connected to said foot member for operating the vehicle accelerator progressively upon said downward longitudinal movement of said platform.

9. The brake-accelerator device of claim 8 wherein a flexible webbing extends coplanar with and covers the vehicle floor and said foot member and said webbing is provided with expansion joint means between said vehicle floor and said foot member for permitting the said movements of said foot member.

10. The brake-accelerator device of claim 8 wherein a flexible webbing extends substantially coplanar with end covers the vehicle floor and said foot member.

11. A break-accelerator device for a brake operating means, comprising, a base member adapted for mounting on the brake operating means, a foot member superimposed on said base member, connecting means joining the said members for longitudinal movement of said foot member relative to said base member in a generally downward-rearward direction relatively perpendicular to the direction of brake pedal movement, cam means partly on each member for progressively separating the upper portions of said members upon said downward rearward longitudinal movement of said foot member, and accelerator operating means operatively connected to the upper portions of said members and actuated by said longitudinal movement between said members.

12. A break-accelerator device for a brake operating means, comprising, a base member adapted for mounting on the brake operating means, a foot member superimposed on said base member in a generally foot-supporting position, connecting means joining said members for lateral pivotal movement and longitudinal sliding movement of said foot member relative to said base member, cam means partly on each member for progressively separating the upper portions of said members upon lateral pivoted movement of said foot member and upon downward longitudinal movement of said foot member, and accelerator operating means operatively connected to upper portions of said members and actuated by said separating movement between said members.

13. The device of claim 12 wherein said foot member includes a foot-supporting platform positioned in a plane relatively perpendicular to the direction of actuating movement of the brake operating means, and said lateral pivoting and longitudinal sliding movements are in the general plane of said platform.

14. The device of claim 12 wherein said cam means include a generally conical cam surface and a cam follower having an interengaging-relationship in all positions of said foot member for causng additional progressive separating of said upper portions of said members upon either additional outward lateral pivoting or additional longitudinal sliding movement of said foot member.

15. The device of claim 12 wherein said foot member includes a foot-supporting platform surface and an outwardly projecting edge wall along the bottom edge of said platform surface for engaging and supporting the heel of the operator's foot.

16. A break-accelerator device for a downwardly-forwardly actuated brake pedal, comprising, an elongated base member adapted for mounting on the brake pedal extending generally downwardly and rearwardly from the brake pedal, a foot member superimposed and mounted on said base member in a generally foot-supporting position said foot member having a platform positioned generally perpendicular to the direction of actuating movement of the brake pedal, said platform having a substantial width for accommodating both feet of an operator, an edge wall on said foot member projecting outwardly from said platform along both lateral extremities and the lower extremities for engagement by the edge of the operator's feet, pin and slot connecting means joining the lower portions of said members for lateral pivotal movement in both directions and longitudinal sliding movement of said foot member relative to said base member in a generally downward-rearward direction substanally perpendicular to the direction of brake pedal movement, cam means partly on each member and having interengaging surfaces for progressively separating the upper portions of said members upon lateral pivotal movement of said foot member and upon downward longitudinal movement of said foot member, said interengaging cam surfaces of a shape for causing the upper portions of said members to move toward each other upon urging the foot member in the direction of actuating movement of the brake pedal, and accelerator operating means comprising a Bowden cable having a housing and wire operatively connected to the respective upper portions of said members and actuated by said separating movement between said members.

17. A break-accelerator device for a vehicle having a forwardly-downwardly actuated brake mechanism comprising, a foot-supporting member positioned in a plane relatively perpendicular to the direction of brake actuation, means supporting said foot-supporting member for movements in the direction of brake actuation and in the general up-down longitudinal direction coplanar with said member, said supporting means and foot-supporting member cooperating to urge said member rearwardly upon downward movement in said longitudinal direction, means operatively connecting said foot-supporting member to the brake mechanism for actuation upon forward-downward movement of said member, and means operatively connected to said foot-supporting member for operating the vehicle accelerator progressively and solely in response to said downward longitudinal movement of said member.

References Cited

UNITED STATES PATENTS

| 1,718,884 | 6/1929 | Thorpe | 192—1 |
| 2,279,458 | 4/1942 | Harkness | 192—3 |
| 2,542,410 | 2/1951 | Hedges | 192—3 |
| 2,707,036 | 4/1955 | Hollub | 192—3 |
| 2,936,867 | 5/1960 | Perry | 192—3 |
| 3,029,916 | 4/1962 | Luijt | 192—3 |
| 3,183,995 | 5/1965 | Schultz | 74—560 |

BENJAMIN W. WYCHE III, *Primary Examiner.*